United States Patent
Othmezouri et al.

(10) Patent No.: US 8,744,169 B2
(45) Date of Patent: Jun. 3, 2014

(54) VOTING STRATEGY FOR VISUAL EGO-MOTION FROM STEREO

(75) Inventors: Gabriel Othmezouri, Brussels (BE); Ichiro Sakata, Brussels (BE); Jiri Matas, Roztoky u Prahy (CZ); Štěpán Obdržálek, Praha (CZ)

(73) Assignees: Toyota Motor Europe NV/SA, Brussels (BE); Czech Technical University in Prague, Praha (CZ)

( * ) Notice: Subject to any disclaimer, the term of this patent is extended or adjusted under 35 U.S.C. 154(b) by 370 days.

(21) Appl. No.: 13/118,959

(22) Filed: May 31, 2011

(65) Prior Publication Data
US 2012/0308114 A1    Dec. 6, 2012

(51) Int. Cl.
*G06K 9/00*    (2006.01)
*H04N 13/00*    (2006.01)

(52) U.S. Cl.
USPC .............................. 382/154; 382/100; 348/42

(58) Field of Classification Search
CPC ............... G06D 1/0246; G06T 7/0075; G06T 2207/10012; G06T 7/0022; G06T 7/20; H04N 13/0239; H04N 2013/0081; B60T 8/172; G07C 5/008; B60R 16/0231; B60R 16/0315; B60G 17/0195
USPC ................ 382/154, 103, 285, 312, 107, 100; 348/43, 135, 208.1, 42, 208.2; 701/1, 701/301
See application file for complete search history.

(56) References Cited

U.S. PATENT DOCUMENTS

| | | | | |
|---|---|---|---|---|
| 6,307,959 B1 * | 10/2001 | Mandelbaum et al. | ....... | 382/154 |
| 6,504,569 B1 * | 1/2003 | Jasinschi et al. | ................ | 348/43 |
| 6,704,621 B1 * | 3/2004 | Stein et al. | ........................ | 701/1 |
| 8,102,427 B2 * | 1/2012 | Jung et al. | .................. | 348/208.1 |
| 8,213,706 B2 * | 7/2012 | Krishnaswamy et al. | .... | 382/154 |
| 8,233,660 B2 * | 7/2012 | Fritsch et al. | ................. | 382/103 |
| 8,310,537 B2 * | 11/2012 | Marti et al. | ................... | 348/135 |
| 2011/0169923 A1 * | 7/2011 | Dellaert et al. | ................. | 348/47 |

OTHER PUBLICATIONS

K. Cornelis, et al. "Drift detection and removal for sequential structure from motion algorithms," IEEE PAMI, Oct. 2004, vol. 26, No. 10, pp. 1249-1259.
A. J. Davison, et al., "MonoSLAM: Real-time single camera SLAM," IEEE PAMI, Jun. 2007, vol. 29, No. 6, pp. 1052-1067.
R. O. Duda, et al., "Use of the Hough Transformation to Detect Lines and Curves in Pictures" Communications of the ACM, Jan. 1972, vol. 15, pp. 11-15.

(Continued)

*Primary Examiner* — Sheela Chawan
(74) *Attorney, Agent, or Firm* — Bacon & Thomas, PLLC

(57) ABSTRACT

Methods and systems for egomotion estimation (e.g. of a vehicle) from visual inputs of a stereo pair of video cameras are described. 3D egomotion estimation is a six degrees of freedom problem in general. In embodiments of the present invention, this is simplified to four dimensions and further decomposed to two two-dimensional sub-solutions. The decomposition allows use of a voting strategy that identifies the most probable solution. An input is a set of image correspondences between two temporally consecutive stereo pairs, i.e. feature points do not need to be tracked over time. The experiments show that even if a trajectory is put together as a simple concatenation of frame-to-frame increments, the results are reliable and precise.

13 Claims, 11 Drawing Sheets

(56) References Cited

OTHER PUBLICATIONS

R. M. Haralick, et al., "Review and analysis of solutions of the three point perspective pose estimation problem," Int. J. Comput. Vision, 1994, vol. 13, No. 3, pp. 331-356, Dec. 1994.

A. Howard, "Real-time stereo visual odometry for autonomous ground vehicles," in IEEE/RSJ International Conference on Intelligent Robots and Systems. IEEE, 2008, pp. 3946-3952, Sep. 22-26, 2008.

T. Lemaire, et al., "Vision-based SLAM: Stereo and monocular approaches," Int. J. Comput. Vision, 2007, vol. 74, No. 3, pp. 343-364, Sep. 2007.

D. Nister, "An efficient solution to the five-point relative pose problem," IEEE PAMI, Jun. 2004, vol. 26, No. 6, pp. 756-777.

D. Nister, et al., "Visual odometry for ground vehicle applications," Journal of Field Robotics, 2006, vol. 23, pp. 3-20, Jan. 26, 2006.

S. Obdrzalek, et al., "Dense linear-time correspondences for tracking," in Workshop on Visual Localization for Mobile Platforms, CVPR 2008, Jun. 2008.

C. F. Olson, et al., "Rover navigation using stereo ego-motion," Robotics and Autonomous Systems, 2003, vol. 43, No. 4, pp. 215-229, Jun. 30, 2003.

T. Thormahlen, et al., "Merging of feature tracks for camera motion estimation from video," in Conference on Visual Media Production, 2008, Nov. 26-27, 2008.

R. I. Hartley, et al., Multiple View Geometry in Computer Vision, 2nd ed. Cambridge University Press, 2004, available at http://www.robots.ox.ac.uk/~vgg/hzbook/, Apr. 19, 2004.

\* cited by examiner

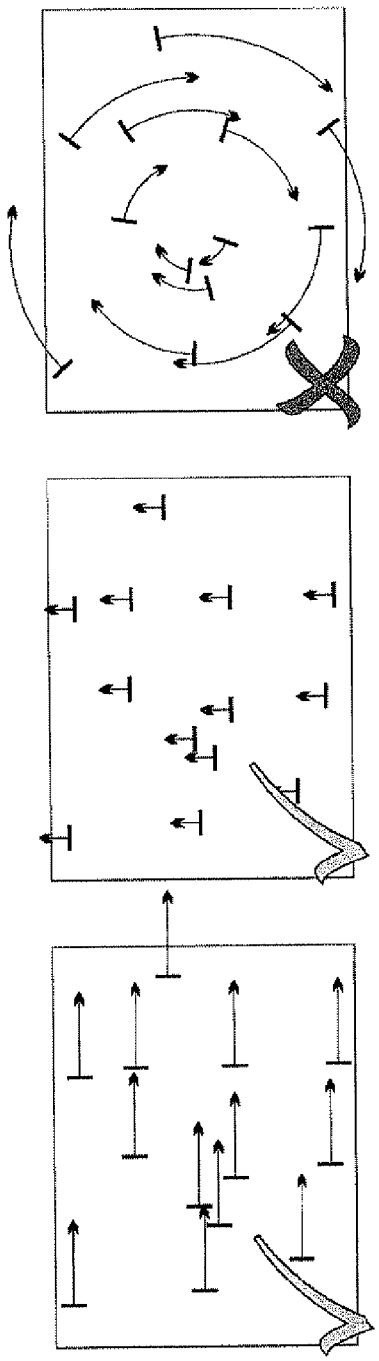
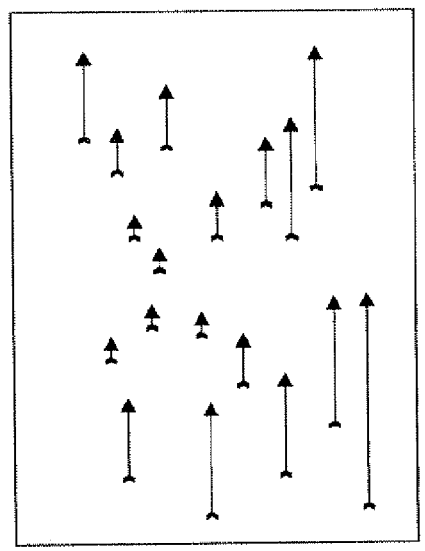
FIG. 2
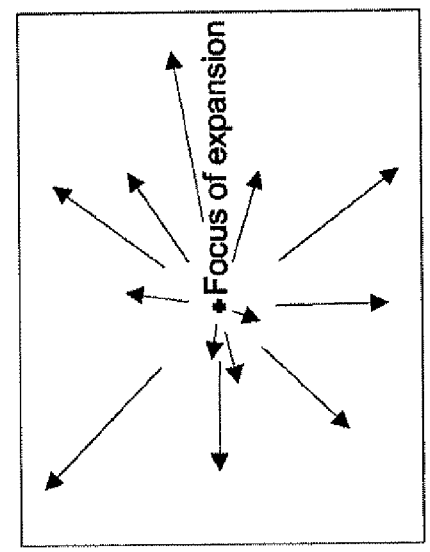
FIG. 3

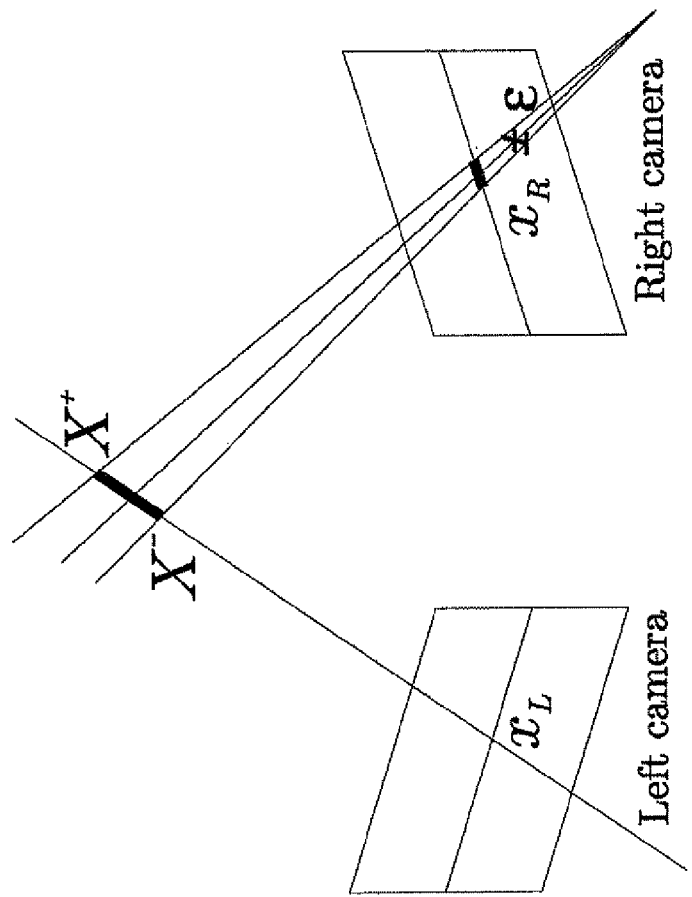
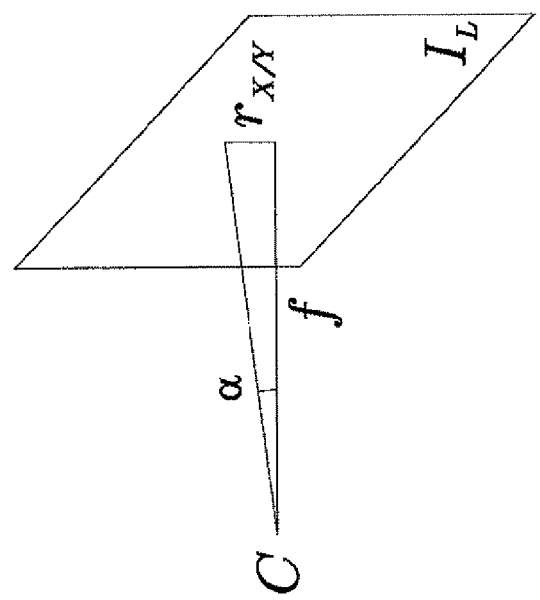
FIG. 4

Algorithm 1 Rotation by voting

Input: $C_L$: correspondences between points of two consecutive images from one of the cameras
Input: $C^t$: correspondences between points of the stereo image pair
Output: $r$: vector of rotation, in pixels /*Initialise the accumulator*/
$A_{\Delta x, \Delta y} := 0$, $\Delta x \in (-\Theta_x, \Theta_x)$, $\Delta y \in (-\Theta_y, \Theta_y)$
foreach $c_i^t := (x_{i,L}^t, y_{i,L}^t, x_{i,R}^t, y_{i,R}^t) \in C^t$,
$c_{j,L}^{t-1} := (x_{j,L}^{t-1}, y_{j,L}^{t-1}, x_{j,L}^t, y_{j,L}^t) \in C_L$
where $x_{i,L}^t = x_{j,L}^t$ and $y_{i,L}^t = y_{j,L}^t$ do

/*$X$: a 3D point in camera-centric coordinates*/
  $X :=$ triangulate$(x_{i,L}^t, y_{i,L}^t, x_{i,R}^t, y_{i,R}^t)$
  /*$d$: distance between $X$ and the camera*/
  $d := \|X, \vec{0}\|$
  /*vote for the rotation, weighted by distance $d$*/
  $\Delta x := x_{j,L}^{t-1} - x_{i,L}^t$
  $\Delta y := y_{j,L}^{t-1} - y_{i,L}^t$
  $A_{\Delta x, \Delta y} := A_{\Delta x, \Delta y} + d$
end

/*find where the maximum is*/
$r := (r_x, r_y) := \underset{\Delta x \in (-\Theta_x, \Theta_x), \Delta y \in (-\Theta_y, \Theta_y)}{\mathrm{argmax}} A_{\Delta x, \Delta y}$

Algorithm 2 Translation by voting

Input: $C_L$: correspondences between points of two consecutive images from one of the cameras
Input: $C^t, C^{t-1}$: correspondences between points of stereo image pairs, current and previous frames
Output: $s$: vector of translation, in world coordinates /*Initialise the accumulator*/
$A_{\Delta x, \Delta z} := 0$,
$\Delta X \in (\Theta_X^{min}, \Theta_X^{max})$, $\Delta Z \in (\Theta_Z^{min}, \Theta_Z^{max})$
foreach $c_i^t := (x_{i,L}^t, y_{i,L}^t, x_{i,R}^t, y_{i,R}^t) \in C^t$,
$c_j^{t-1} := (x_{j,L}^{t-1}, y_{j,L}^{t-1}, x_{j,R}^{t-1}, y_{j,R}^{t-1}) \in C^{t-1}$
$c_{k,L} := (x_{k,L}^t, y_{k,L}^t, x_{k,L}^{t-1}, y_{k,L}^{t-1}) \in C_L$
where $x_{i,L}^t = x_{k,L}^t$ and $y_{i,L}^t = y_{k,L}^t$ and $x_{j,L}^{t-1} = x_{k,L}^{t-1}$ and
$y_{j,L}^{t-1} = y_{k,L}^{t-1}$ do

/*$X^{\pm,t}, X^{\pm,t-1}$, endpoints of 3D tolerance segments in camera-centric coordinates*/
  $\hat{X}^{-,t} :=$ triangulate$(x_{i,L}^t, y_{i,L}^t, x_{i,R}^t - \epsilon, y_{i,R}^t)$
  $\hat{X}^{+,t} :=$ triangulate$(x_{i,L}^t, y_{i,L}^t, x_{i,R}^t + \epsilon, y_{i,R}^t)$
  $X^{-,t-1} :=$ triangulate$(x_{j,L}^{t-1}, y_{j,L}^{t-1}, x_{j,R}^{t-1} - \epsilon, y_{j,R}^{t-1})$
  $X^{+,t-1} :=$ triangulate$(x_{j,L}^{t-1}, y_{j,L}^{t-1}, x_{j,R}^{t-1} + \epsilon, y_{j,R}^{t-1})$
  /*Rotate $\hat{X}^{\pm,t}$ by $\theta$ and $\psi$*/
  $X^{\pm,t} := R_{\theta,\psi} \cdot \hat{X}^{\pm,t}$
  /*vote for the translation $s$ with a line segment $\overline{uv}$*/
  $u := (X_X^{-,t-1} - X_X^{+,t}, X_Z^{+,t-1} - X_Z^{-,t})$
  $v := (X_X^{+,t-1} - X_X^{-,t}, X_Z^{+,t-1} - X_Z^{-,t})$
  addLineSegment$(A, \overline{uv})$
end

/*add tolerance to other forms of noise*/
$\bar{A} :=$ convolve$(A, \mathcal{N}(0, \sigma))$
/*find where the maximum is*/
$s := (s_X, s_Z) := \underset{\Delta X \in (\Theta_X^{min}, \Theta_X^{max}), \Delta Z \in (\Theta_Z^{min}, \Theta_Z^{max})}{\mathrm{argmax}} \bar{A}_{\Delta X, \Delta Z}$

FIG. 14

VOTING STRATEGY FOR VISUAL EGO-MOTION FROM STEREO

This invention relates to apparatus and methods for image processing of stereo images to determine egomotion of a vehicle and to corresponding computer programs for carrying out such methods and to memory devices storing the computer programs and also to corresponding integrated circuits.

TECHNICAL BACKGROUND

Voting is one of the methods for estimation of an unknown parameter from known measurements. Depending upon the algorithm, measurements that are incorrect and/or imprecise can be accommodated and hopefully do not impair the result. In principle, each measurement votes for some (discrete) values of the unknown parameter. Each vote can have a different weight. After counting all the votes, the parameter value with most votes is chosen as the most probable solution. If the measurements are imprecise, and the error tolerance interval is known, the votes are spread over several values, covering the intervals. With enough imprecise measurements the most probable value might still be found in the intersection of the tolerance intervals. The solution is found at the value most voted for. It does not have to have a majority of the votes, but a maximum. So if the incorrect measurements are uniformly distributed, they do not affect the solution even if they are many, as the maximum is preserved. But if the incorrect measurements are concentrated, they may overweight the correct value and ruin the result.

There are several advantages to the voting approach. First, the most probable value is always found with a single iteration over all measurements. There is no random process involved, as in RANSAC method. Second, it is easy to accommodate for all the different distributions and confidence intervals of the votes. It is also easy to formulate it statistically. If the probability can be expressed of a measurement given a value of the sought parameter, the probability can be exactly the number by which is the corresponding accumulator bin is incremented. There are also disadvantages. The main is that the voting approach is suitable only for low-dimensional problems. The number of bins in the accumulator is the product of the number of possible values in each dimension, which in turn is given by the range of the values and their discretisation. If each dimension is quantised to hundreds or thousands of values, the practical usability stops at two dimensional problems. Then the memory required to store the accumulator is large as well as with the computational cost of traversal operations (initialization and maximum search). A second disadvantage is that adding a vote can be computationally expensive if it spans a large number of accumulator bins or it is costly to evaluate which bins it covers. Usually 2D votes have the fowl of straight lines or line segments, which are easy enough to discretise.

SUMMARY OF THE INVENTION

The present invention provides methods and systems for egomotion estimation (e.g. of a vehicle) from visual inputs of a stereo pair of video cameras. 3D egomotion estimation is a six degrees of freedom problem in general. In embodiments of the present invention, this is simplified to four dimensions and further decomposed to two two-dimensional sub-solutions. The decomposition allows use of a voting strategy that identifies the most probable solution. An input is a set of image correspondences between two temporally consecutive stereo pairs, i.e. feature points do not need to be tracked over time. The experiments show that even if a trajectory is put together as a simple concatenation of frame-to-frame increments, the results are reliable and precise.

Experimental evaluation on real-world sequences has shown that although the egomotion was computed in the form of differences between two frames, e.g. consecutive video frames, the method provides reliable and precise output. The occasional mistakes occur when the visual input is dominated by another object moving in the scene. A complex egomotion estimation system can be build on top of the proposed procedure. Results of the visual estimator can be combined with other sensors available, e.g. accelerometers or the CANbus car controls. Restrictions from a vehicle motion model can be included, e.g. reflecting the minimal turning radius. And corrections at global scale can be obtained using a positioning system (GPS) and/or by any of the vision methods for the long-term drift removal.

The present invention provides a method, e.g. a computer based method, for computation of egomotion of a moving stereo camera from a stereo image sequence, wherein a six-dimensional egomotion estimation is simplified and decomposed into first and second two-dimensional subproblems. The advantage is that this is easier to solve robustly.

The first two-dimensional subproblem can be solved for camera rotation and the second subproblem can be solved the camera translation.

The present invention also provides a method e.g. a computer based method for computing pitch and yaw of camera rotation independently of translation by a statistically robust estimation.

The robust estimation is preferably done by voting. Votes of the voting are preferably directly the motion vectors e.g. image correspondence in temporally consecutive images, observed in one of the cameras and the weight of the votes is a function of 3D distance of the observed objects The present invention also includes a method for computing camera translation by a statistically robust estimation e.g. a computer based method. The robust estimation is preferably done by voting for which the camera rotation has to be known from previous computation 3D triangulation errors can be explicitly modeled and reflected in the voting process The present invention also provides a computer based system for computation of egomotion of a moving stereo camera from a stereo image sequence, wherein the system is adapted for a six-dimensional egomotion estimation which is simplified and decomposed into first and second two-dimensional subproblems. The advantage is that this is easier to solve robustly.

The system can be adapted so that the first two-dimensional subproblem can be solved for camera rotation and the second subproblem can be solved the camera translation.

The present invention also provides a computer based system for computing pitch and yaw of camera rotation independently of translation by a statistically robust estimation.

The system is preferably adapted so that robust estimation is preferably done by voting. Votes of the voting are preferably directly the motion vectors e.g. image correspondence in temporally consecutive images, observed in one of the cameras and the weight of the votes is a function of 3D distance of the observed objects The present invention also includes a computer based system for computing camera translation by a statistically robust estimation. The robust estimation is preferably done by voting for which the camera rotation has to be known from previous computation 3D triangulation errors can be explicitly modeled and reflected in the voting process The present invention also includes computer program products, e.g. stored on non-transitory machine readable storage media such as CD-ROM's, DVD-ROMS, solid state memories, USB memory sticks etc. able to implement any of the methods or systems of the present invention when executed on a processing engine such as a microprocessor in a computer or embedded processor.

BRIEF DESCRIPTION OF THE DRAWINGS

FIG. 2 illustrates image motion vectors due to individual components of 3D rotation, whereby yaw and pitch are important, and the roll can be ignored.

FIG. 3 illustrates image motion vectors due to vehicle translation. Forward motion on the left, sidewise on the right.

FIG. 4 shows on the left: Relation between a rotation vector r, in image coordinates, and the angle of rotation, whereas on the right: Estimation of 3D reconstruction tolerance.

FIG. 13 shows algorithm 1—rotation by voting in accordance with an embodiment of the present invention.

FIG. 14 shows algorithm 2—translation by voting in accordance with an embodiment of the present invention.

DETAILED DESCRIPTION OF EMBODIMENTS OF THE INVENTION

The present invention relates to egomotion estimation for a sequence of video frames or a series of still images. An embodiment of the present invention is the estimation of egomotion of a vehicle carrying a stereo pair of video cameras. The present invention can find use with urban scenes having the possibility of a heavy traffic. A large part, even a majority, of the field of view can be covered by moving objects, which distracts the egomotion estimation. Secondly, the vehicle can move in an open space, where the distance to the observed objects is large compared to the baseline of the stereo pair. This results in very imprecise 3D triangulation, with spatial uncertainty of triangulated points of tens of meters. This is different to navigation in small closed environments, e.g. in laboratories or corridors, where the triangulation errors are smaller.

Figure 1:
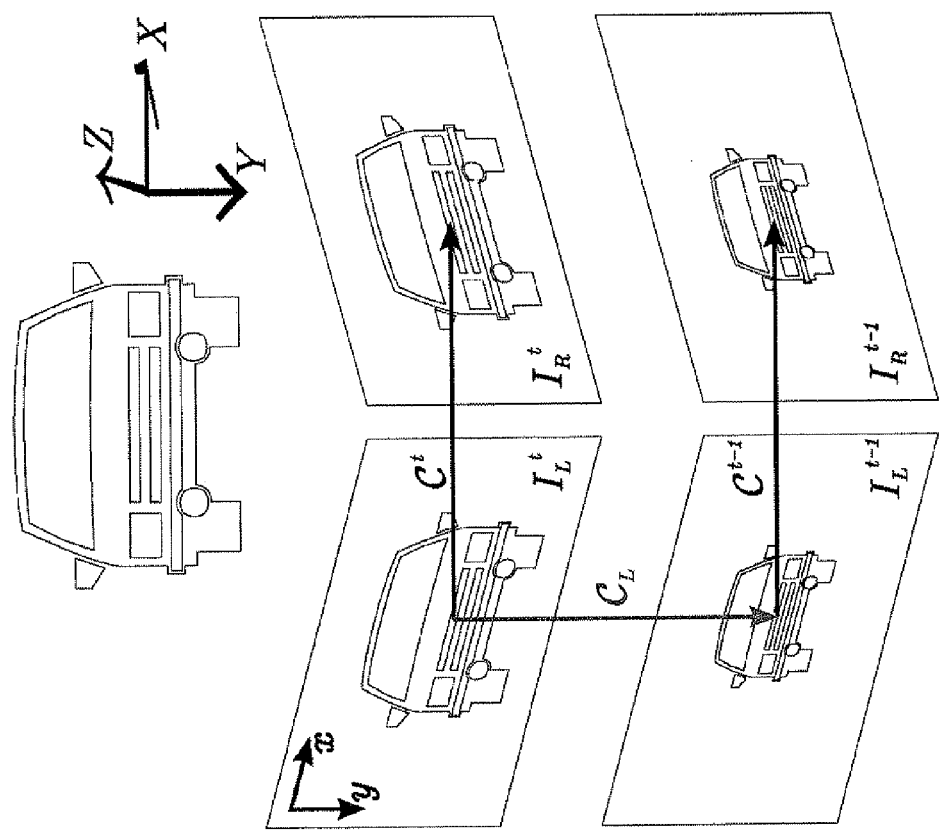
FIG. 1 illustrates images involved in the computation according to embodiments of the present invention—two stereo pairs that are connected by three sets of image correspondences.
Figure 5:
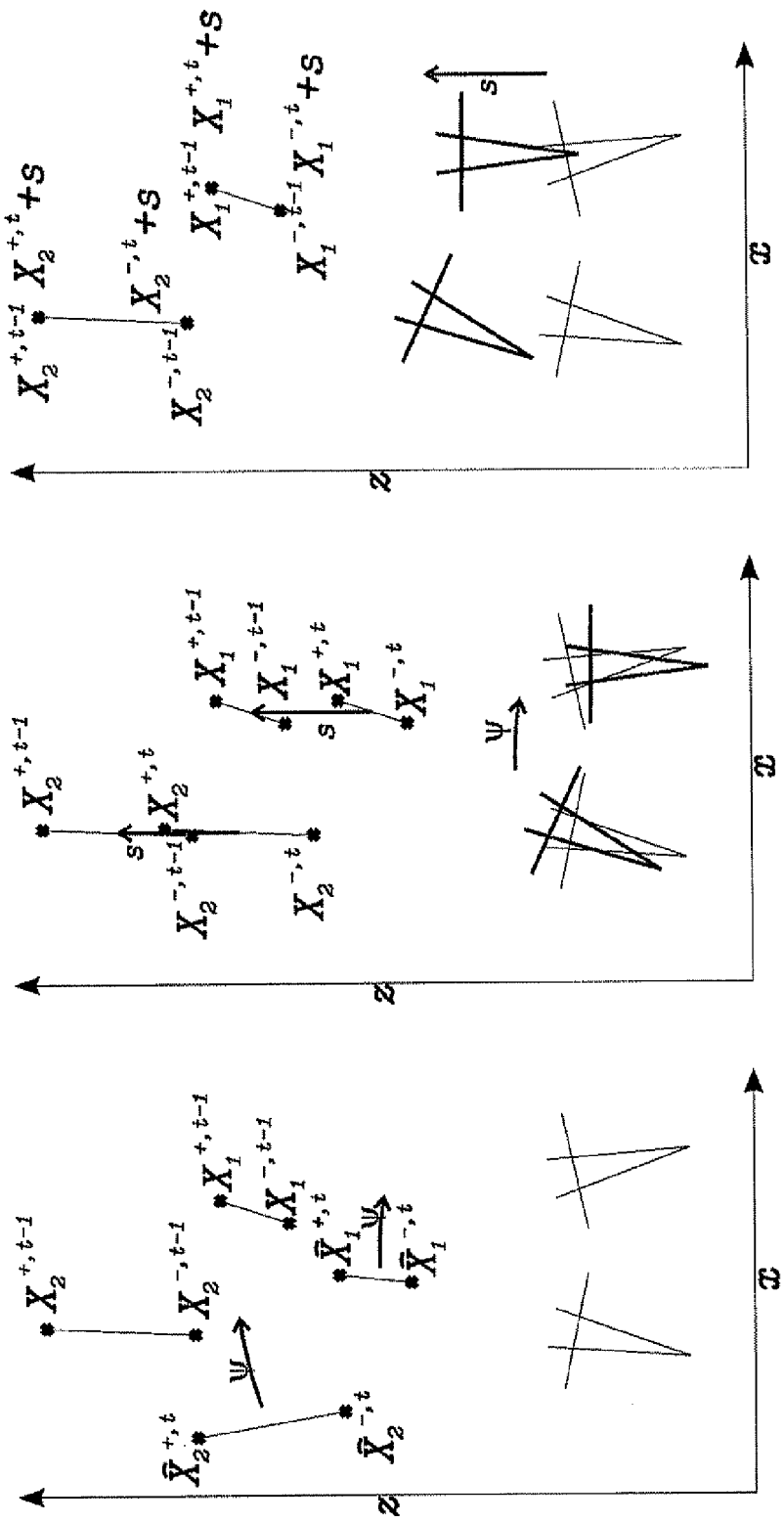
FIG. 5 illustrates two-stage egomotion estimation according to embodiments of the present invention. The rotation (yaw and pitch) is computed first, followed by the translation.

The problem of egomotion estimation has several levels, e.g. computing the increment in position and orientation between two video frames in a sequence thereof, e.g. between two frames of the sequence. From that estimate, precision can be improved by connecting image correspondences over multiple frames, and by remembering visited places and closing the trajectory on a repeated visit. Also, the visual egomotion estimation can be combined with outputs of other sensors, namely with GPS and with vehicle driving controls. The 3D motion has six unknown parameters, three for translation in x, y, z co-ordinates, and three for rotation angles, called yaw, pitch and roll. Since 2D top-view projection of the trajectory is of most interest for land-based vehicles, embodiments of the present invention comprise a simplified solution. First it is assumed that the roll (which is the rotation around the vehicle's front-rear axis) is negligible. Therefore only two of the angles of rotation need to be estimated (FIG. 2). The elevation of the car does not need to be computed. This leads to a four-dimensional embodiment in place of the original six-dimensional. In a further embodiment, the method can be decomposed into two two-dimensional subsolutions, each solvable by the voting approach. Preferably, two rotation angles are estimated first by a process that is independent of the translation. The translation is computed in a second step, in which rotation angles have to be known (FIG. 5). The inputs to the method are image correspondences, as shown in FIG. 1. The correspondences are computed for all the stereo image pairs, which after 3D triangulation provide 3D points in a camera-centric co-ordinate system. Unfortunately, the triangulation can have large numerical errors. Use is made of correspondences between two images of the sequence, e.g. two consecutive images of the left (or right) camera. These give us image motion vectors, as shown in FIGS. 2 and 3, and also 3D motion vectors if they are connecting the triangulated 3D points. The 3D vectors are again in camera-centric co-ordinate bases.

The next step is to find a transformation of the camera bases such that the 3D vectors of static objects collapse to single points. Since it is not known which objects are static, it is assumed that these form the largest consistent subset of the 3D vectors (hence the voting). Accordingly, the most prevalent motion observed is the motion of the vehicle relative to the static background.

The present invention also provides an estimating the angles of rotation. Image correspondences observed between two video frames of the sequence, e.g. consecutive video frames in one camera are a combination of the motion fields show in FIGS. 2 and 3 (yaw and pitch rotations, forward and sidewise translation). An important observation is that the rotations produce identical motion vectors for all scene points while the translation produces motion vectors whose length decreases with the distance. The motion vectors corresponding to the rotations directly represent the rotation angles (FIG. 4 left). In the context of estimation of the rotation, the translation components represent noise. Motion vectors of points infinitely far away (the distance is known from the 3D triangulation) have only the rotation components, the translation components are zero. So in one variation of this embodiment, only the most distant points are taken and vote is carried out with their motion vectors. In another example one of the embodiment, to avoid hard decisions based on the distance of the observed 3D points and to avoid a potential failure when none of the points are far enough, all of the motion vectors are taken and the weight of the vote is adjusted proportionally to the distance. This way the distant points, if any, overweigh the closer ones in the voting.

A suitable procedure is given in Algorithm 1 (FIG. 13) as one embodiment of the present invention.

The present invention also provides an estimation of the translation on the ground plane. For the translation estimate, the 3D motion vectors are used, obtained by triangulating stereo correspondences in two image pairs, e.g. consecutive image pairs and connecting the resulting 3D points by correspondences in the left (or right) camera. As said above, until the camera motion is known the triangulated points (and thus the 3D motion vectors) are in a camera-centric co-ordinate system.

Figure 6:
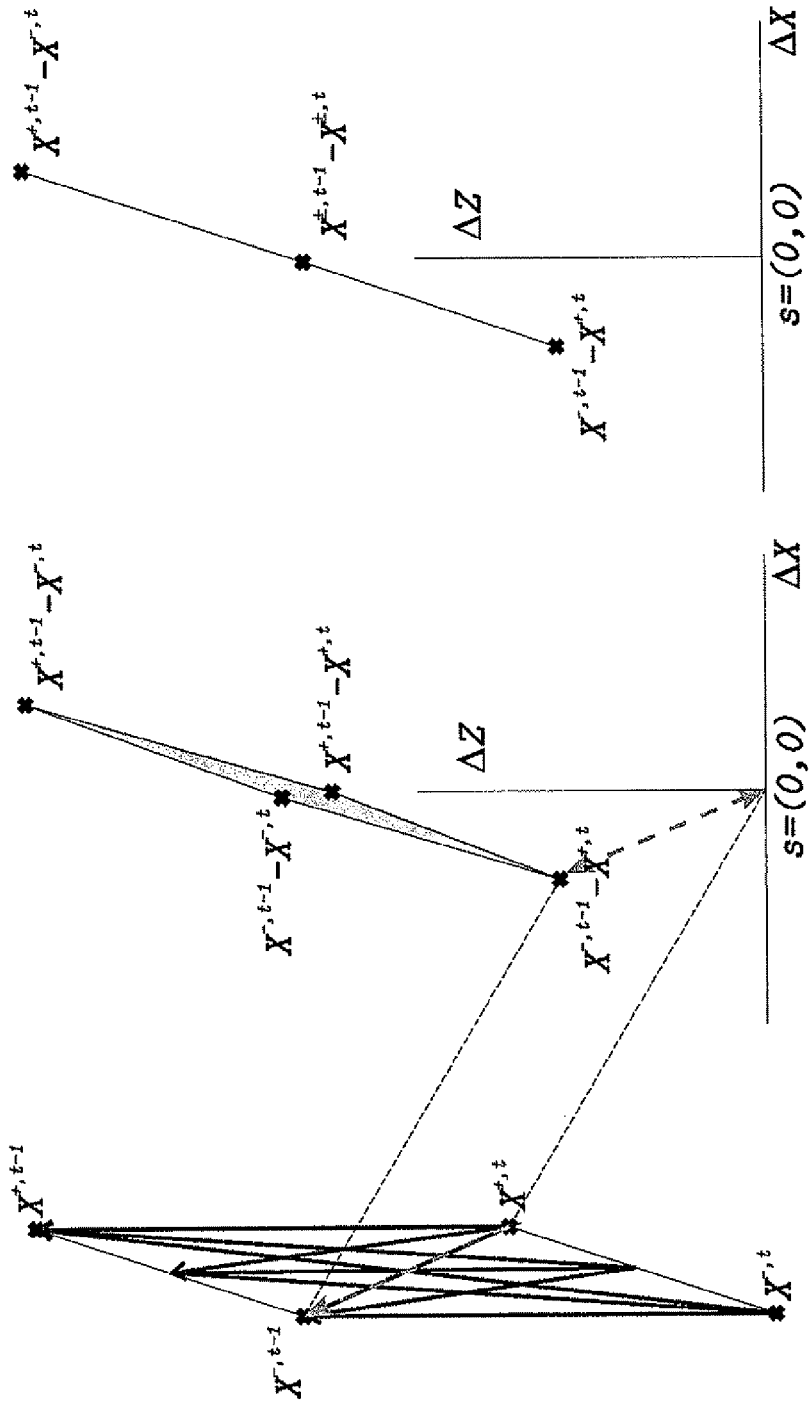
FIG. 6 illustrates a shape of the translation vote in accordance with an embodiment of the present invention.

The next step is to align the endpoints of the vectors by moving the cameras, the movement being the sought-after egomotion. The complications here are the large triangulation errors, which are as an example tabulated in Table 1 for one instance of stereo camera configuration. Fortunately, the errors can be modelled. The source of the error is the imprecision of stereo image correspondences. It is assumed that the correspondences are found with tolerance of plus minus s pixels, e.g. one pixel. To project the tolerance to the 3D space, the stereo correspondence is triangulated twice, once for each endpoint of the one pixel tolerance interval (i.e. two pixels apart). This gives two endpoints of a 3D tolerance segment (FIG. 4, right side). Therefore, instead of a triangulated 3D point there is a 3D linear segment. And the 3D motion vector, mentioned before as the connector of two corresponding camera-centric 3D points, is in fact a connector of the two 3D tolerance segments. An example of this is shown in FIG. 5. From the previous step the rotation ($\psi$ in FIG. 5) is known, so it is compensated for first. What remains to be estimated is a single 2D translation vector s—the top-view projection of the camera pair motion. Again a voting is used, because of the presence of incorrect correspondences and false motions observed on moving scene objects. Due to the triangulation imprecisions a 3D correspondences do not imply the translation exactly. The sought translation can be any vector that originates anywhere on the previous-frame 3D tolerance segment and ends anywhere on the one from the current frame. The situation is depicted in FIG. 6, which shows a single 3D correspondence. Any of the blue arrows in the left part represents a possible translation s. If brought to a common origin, all the possible translations form a tetrahedron shown in the middle of the figure. After simplifying assumption that lengths of the 3D tolerance segments remain the same in two consecutive frames, the tetrahedron collapses to a linear segment, which is easier to render into the accumulator as the vote.

In summary, each 3D correspondence, after rotation by the estimated angle $\psi$, combines its two tolerance segments to one linear segment of possible translations, and a vote is cast for every point along the segment. Ideally, all votes from different parts of the static scene intersect in one bin of the accumulator, which corresponds to the sought translation vector s (see FIG. 7).

Figure 15:
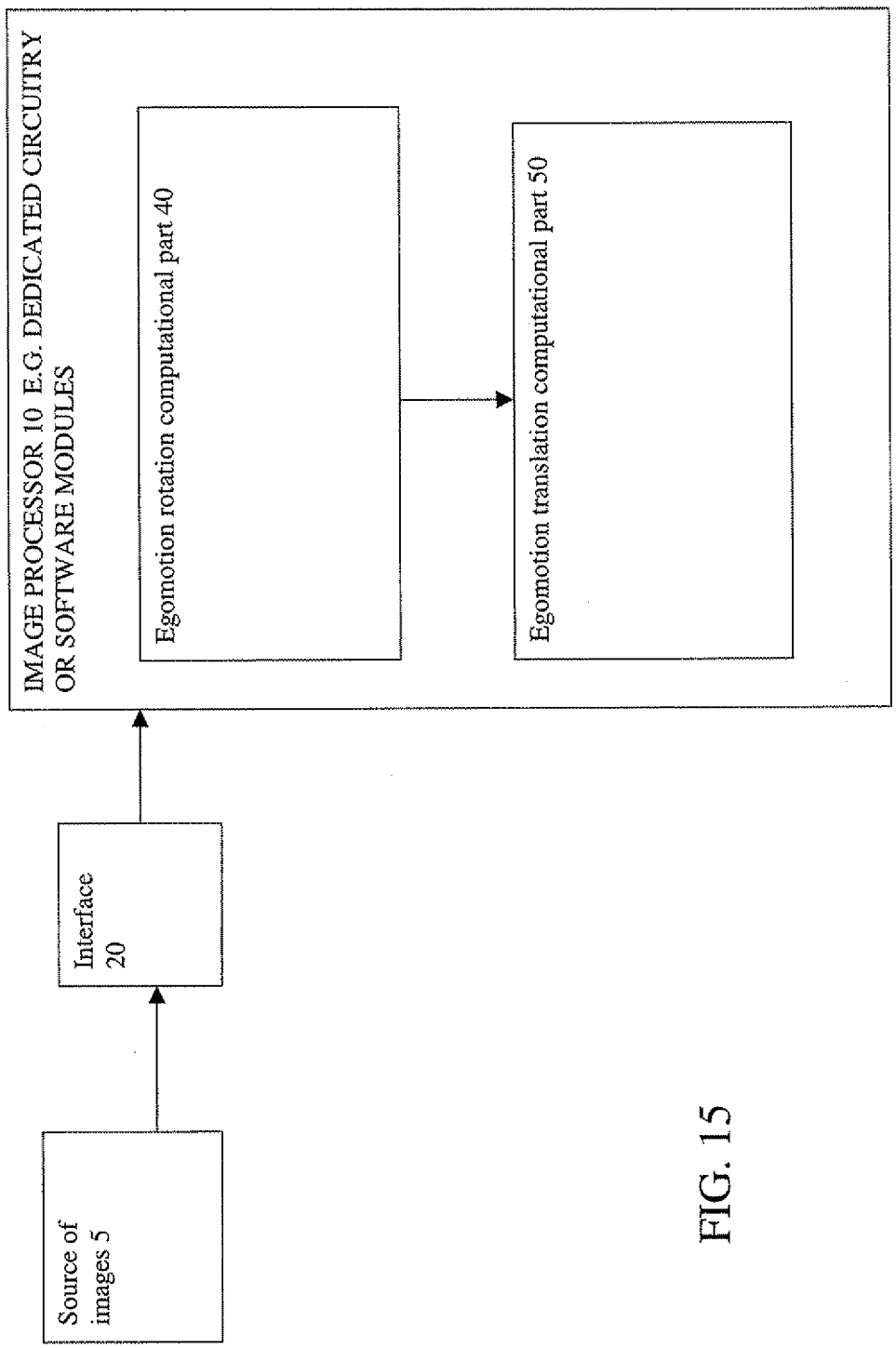
FIG. 15 is a schematic representation of an image processor in accordance with an embodiment of the present invention.

FIG. 15 shows an image processor or processor system 10 according to an embodiment. The system can be a computer based system, i.e. including a processor, memory and a display. The image processor or processor system 10 can be implemented as for example one or more integrated circuits having hardware such as circuit blocks dedicated to each of the parts shown, or can be implemented for example as software modules executed by a general purpose processor in sequence, as in a server. The parts shown include an input interface 20 for receiving an input image or image stream (such as frames of a video, in real time or non real time) from an image source device 5, e.g. a stereo camera delivering single frames. The images or frames of the video sequence are processed by rotational estimation computation part 40. The rotational estimation computation part 40 estimates an egomotion rotation using a set of correspondences between images in the sequence. The results of the operation by part 40 are delivered to an egomotion translation computation part 50. There can be other parts to the image processor not shown in this figure, at any stage of the processor.

Appropriate processing of the video data may for example be used for recognition and reporting of main objects relevant to a moving object, e.g. vehicle, or to the driver thereof. Objects of interest may be any suitable object, such as for example and not limited to, the road, pedestrians, vehicles, obstacles, traffic lights, etc. Processing of the video data may be performed in real-time or may be performed on stored video data. Hence the present invention can be used as an enhancement to a navigational system. Alternatively outputs of the present invention may be used to facilitate other algorithms, e.g. to pedestrian detection algorithms. Outputs of the present invention can be used increase the accuracy of algorithms that detect objects, e.g. pedestrians or movements of these objects. A device 55 can be provided for interpreting or taking action based on an output of the present invention. This can be used for example in a vehicle control system, or driver assistance system, a robotic system, a surveillance system for detecting intruders and so on. The present invention is not limited to automobiles.

A detailed embodiment of the present invention will now be described.

Egomation Estimation

The egomotion is computed in the form of increments from one stereo image pair to another. Therefore, only a limited number of images are involved in the computation at a time—the current pair and one or more preceding ones. Preferably, only four images are involved in the computation at a time—the current pair and a preceding one, especially the immediately preceding one. The situation is illustrated in FIG. 1. The figure depicts the four images: a current stereo pair taken at time t (images $I^t_L$ and $I^t_R$) and a preceding one taken at a previous time such as t−1 (image $I^{t-1}_L$ and $I^{t-1}_R$) although other previous times can be used and not just t−1. Three sets of pixel correspondences are computed. Two sets ($C^t$ and $C^{t-1}$: $\{c^i=(x_L, y_L, x_R, y_R)\}$ link pixels in the stereo pairs, the third one ($C_L$:$\{c_i=(x^t_L, y^t_L, x^{t-1}_L, y^{t-1}_L)\}$ connects the two images of the left camera. A 3D scene point X is at time t projected to $I^t_L$ and $I^t_R$ at locations $(x^t_L, y^t_L)$ and $(x^t_R, y^t_R)$. At a or the previous time t−1, it was projected to a or the preceding image pair to pixels, e.g. $(x^{t-1}_L, y^{t-1}_L)$ and $(x^{t-1}_R, y^{t-1}_R)$. Image correspondences can be computed with any suitable approach of which the approach described in reference 10 is an example although the exact method for computation of correspondences is not considered a limitation on the present invention. For example, a semi-dense correspondence map can be used, typically tens of thousands of correspondences are found for a pair of 640×480 images.

The camera pair is calibrated, whence the two stereo correspondence sets $C^t$ and $C^{t-1}$ can be triangulated, yielding two sets of 3D points $X^t$ and $X^{t-1}$ in camera-centric coordinates. The two 3D point sets are connected together by the correspondence set $C_L$, forming a set of 3D vectors. A 3D camera motion can be decomposed into two independent components, alignment of directions of the camera axes (camera rotation) and alignment of the camera centers (camera translation). The decomposition is commutative.

Estimation of Rotation

The rotation estimation is computed using the 'temporal' correspondence set $C_L$, containing motion vectors $c_L=(x^t_L; y^t_L, x^{t-1}_L, y^{t-1}_L) \in C_L$. $\in$ means "an element of". The effect of the rotation on the motion vectors, assuming for now that the vehicle position is not changing and that the scene is static will now be discussed. FIG. 2 illustrates image motion vectors caused by pitch, yaw and roll components of the 3D rotation (for a camera with spherical projection, which well approximates a perspective camera for narrow fields of view). Assuming zero roll for ground vehicles, the motion vectors caused by rotation are linear segments that are identical across the image, independent of object distance. If the camera also moves, in addition to rotating, the observed motion field is affected differently. FIG. 3 illustrates the effect. Forward motion produces motion vectors oriented in the direction of the so called focus of expansion, i.e. image of the scene point towards which the camera moves. A sidewise motion produces parallel motion vectors similar to the rotation. What is important, in both types of the translation the length of the motion vectors decreases with distance to the observed scene point. The observed motion field is a combination of the translation and rotation components, where the effect of the translation decreases with distance—motion vectors of points at infinity are affected only by the rotation. And the distances are known from the stereo triangulation. This leads us to a voting algorithm for rotation estimation. It is estimated by adding votes to an accumulator, as in the Hough transform [see reference 12]. Votes are cast by motion vectors $c_L \in C_L$ with the weight of the vote being proportional to $c_L$'s 3D distance to the camera. The accumulator domain is in image pixels, its resolution is set to one pixel and its range to $(-\Theta_x, \Theta_x)$ on the x-axis and $(-\Theta_y, \Theta_y)$ on the y-axis. The resolution is given by the precision with which the image correspondences are computed. The bounds on the maximal rotation can be set empirically and depend on maximal angular speed and frame rate and resolution of the cameras. For example, in one setup: $\Theta_x=100$ and $\Theta_y=50$ pixels, which cover all realistic situations with a large margin. The procedure is summarized in Algorithm 1 (FIG. 13).

At the end of the procedure the rotation vector r ($r_x$, $r_y$) is identified, in pixels, which has the largest support by the motion vectors. The precision of the estimate is further improved (optionally on the x-axis only) by fitting a quadratic curve to its neighboring support values in the accumulator, i.e. to $A(r_{x-1}, r_y)$, $A(r_x, r_y)$ and $A(r_{x+1}, r_y)$. Position of the maximum on the parabola is found in a closed form, and it can give the rotation vector r with a sub-pixel precision.

A final step is to convert the pixel-based vector r to yaw ($\psi$) and pitch ($\theta$) angles. As shown in FIG. 4, the angle is the inverse tangent of the vector length multiplied by the pixel size p and divided by the focal length f:

$$\psi=\tan^{-1}(r_x p_x/f)\ \theta=\tan^{-1}(r_y p_y/f),$$

where $p_x$ and $p_y$ are horizontal and vertical pixel dimensions, in millimeters.

Conveniently, in the standard representation of intrinsic camera parameters by an upper triangular 3×3 matrix K [11], the $f/p_x$ and $f/p_y$ ratios are found on its first two diagonal elements. Therefore, $$\psi=\tan^{-1}(r_x/K_{1,1}), \theta=\tan^{-1}(r_y/K_{2,2}).$$

Naturally, the system would be fooled if the field of view is obstructed by a large moving object, e.g. a truck passing close in front of the vehicle. These situations can be detected, as the 3D depths are known, and failure in the estimation can be reported. Such a detection is implemented, failures of this kind can be prevented.

Estimation of Translation

The estimation of translation starts from the two sets of triangulated 3D points, $X_t$ and $X_{t-1}$, observed in two views, e.g. consecutive views. The points are in camera-centric co-ordinates, i.e. the origins of co-ordinate systems coincide with the cameras.

A co-ordinate system transformation is sought that will align the scene points while moving the cameras accordingly. Knowing the rotation between the two views, $X_t$ is rotated around the origin (camera) by $\theta$ and $\psi$, see FIG. 5 for an illustration. After that, the transformation from $X_{t-1}$ to $X_t$ is a translation s. What complicates its identification can be considerable imprecision in the triangulated co-ordinates and errors in the established correspondences. Accordingly, a search is performed for a translation vector s that would best explain the difference between the two point sets, given the triangulation errors. A voting scheme is adopted in order to be robust to mismatches in the correspondence sets.

Triangulation Uncertainty

With respect to triangulation uncertainty, a 3D point X is a measurement given by a stereo correspondence $c^t_i=(x^t_{i,L}, y^t_{i,L}; x^t_{i,R}, y^t_{i,R}) \in C^t$, with uncertainty increasing with distance to the object ($\in$ means "element of"). The uncertainty can be a function of imprecision in the correspondence (in pixels), of camera resolution and calibration, of the disparity, pixel's position in image, and generally of the image content (e.g. there may be a smaller uncertainty in higher contrast areas). It is assumed that the images are rectified, i.e. that for any stereo correspondence $c^t_i=(x^t_{i,L}, y^t_{i,L}, x^t_{i,R}, y^t_{i,R}) \in C^t$ it holds that $y^t_{i,L}=y^t_{i,R}$. The correspondence of $(x^t_{i,L}, y^t_{i,L})$ is then given by a single number, the disparity $di=x^t_{i,R}-x^t_{i,L}$. Let the disparities be computed with a tolerance of $\epsilon$, say $\epsilon=1$ pixel. I.e. if a correspondence with a disparity $\hat{d}$ was established, the actual disparity is considered to be $d \in (\hat{d}-\epsilon, \hat{d}+\epsilon)$ with a uniform distribution over the interval.

The pixel-wise tolerance is transformed to the 3D by triangulating both ends of the interval, i.e. both $(x^t_{i,L}, y^t_{i,L}, x^t_{i,R}-\epsilon, y^t_{i,R})$ and $(x^t_{i,L}, y^t_{i,L}, x^t_{i,R}+\epsilon, y^t_{i,R})$. See FIG. 4 for an illustration. This gives two endpoints of a 3D line segment on which the scene point $X_i$ is located with distribution approximately again uniform. The segment goes in the direction to the reference (left) camera and its length increases with the distance, reflecting the higher uncertainty of more distant depth measurements. Table 1 shows the uncertainty of an example of a stereo configuration, tabulated for some typical distances. There are other forms of triangulation imprecision, coming from, e.g. imprecise calibration of the stereo pair, but their magnitude is significantly smaller. They are all together modelled as Gaussian and are treated later.

TABLE 1

3D TRIANGULATION UNCERTAINTY FOR IMAGE CORRESPONDENCES WITH TOLERANCE 1 PIXEL.

| Distance to the object | Uncertainty of 3D triangulations |
|---|---|
| 5 m | ±6 cm |
| 10 m | ±22 cm |
| 15 m | ±49 cm |
| 20 m | ±88 cm |
| 30 m | ±200 cm |
| 50 m | ±555 cm |
| 80 m | ±1600 cm |
| 100 m | ±2500 cm |

Translation by Voting

With respect to translation by voting, FIG. 5 illustrates the two-step egomotion recovery method from a top view. Two scene points, X1 and X2, are shown as their respective tolerance segments. We denote as X− the closer end of the tolerance segment, obtained as triangulation of $(X_L, y_L, x_R-\epsilon c, y^t_L)$, and as X+ the farther end, of $(x_L, y_L, x_R+\epsilon, y^t_L)$. In the figure on the left, the points are in camera-centric co-ordinates, as triangulated from the two stereo pairs. The middle figure shows the situation after rotation by the estimated yaw was applied to the points from the current t-th frame.

Finally, on the right, the points from the t-th frame are aligned with their counterparts from the (t−1)-th frame by the translation vector s, yet unknown.

FIG. 6 shows what the vector s can be, i.e. how can we move from $X^{t-1}$ in a or the previous frame, represented by tolerance segment $\overline{X^{-,t-1}X^{+,t-1}}$, to $X^t$, represented by segment $\overline{X^{-,t}X^{+,t}}$, in the current frame. All possible translation vectors form (in the 2D top view projection) a tetragon shown in the middle of the figure. The coordinates of its vertices are the differences between the tolerance segment endpoints: $X^{-,t-1}-X^{+,t}$, $X^{-,t-1}-X^-$, $X^{+,t-1}-X^{+,t}$ and $X^{+,t-1}-X^{-,t}$. This tetragon represents the vote that X casts into the accumulator. Under the assumption that the distance to the point X does not change much between the frames, i.e. that it is relatively larger than the length of the translation vector s, the tolerance segments do not change significantly. It can be assumed that they are identical, i.e. $X^{+,t-1}-X^{-,t-1}=X^{+,t}-X^{-,t}$. In that case, the vote degenerates to a line segment, $\overline{(X^{-,t-1}-X^{+,t})(X^{+,t-1}-X^{-,t})}$ as shown on the right side of FIG. 6.

Figure 7:
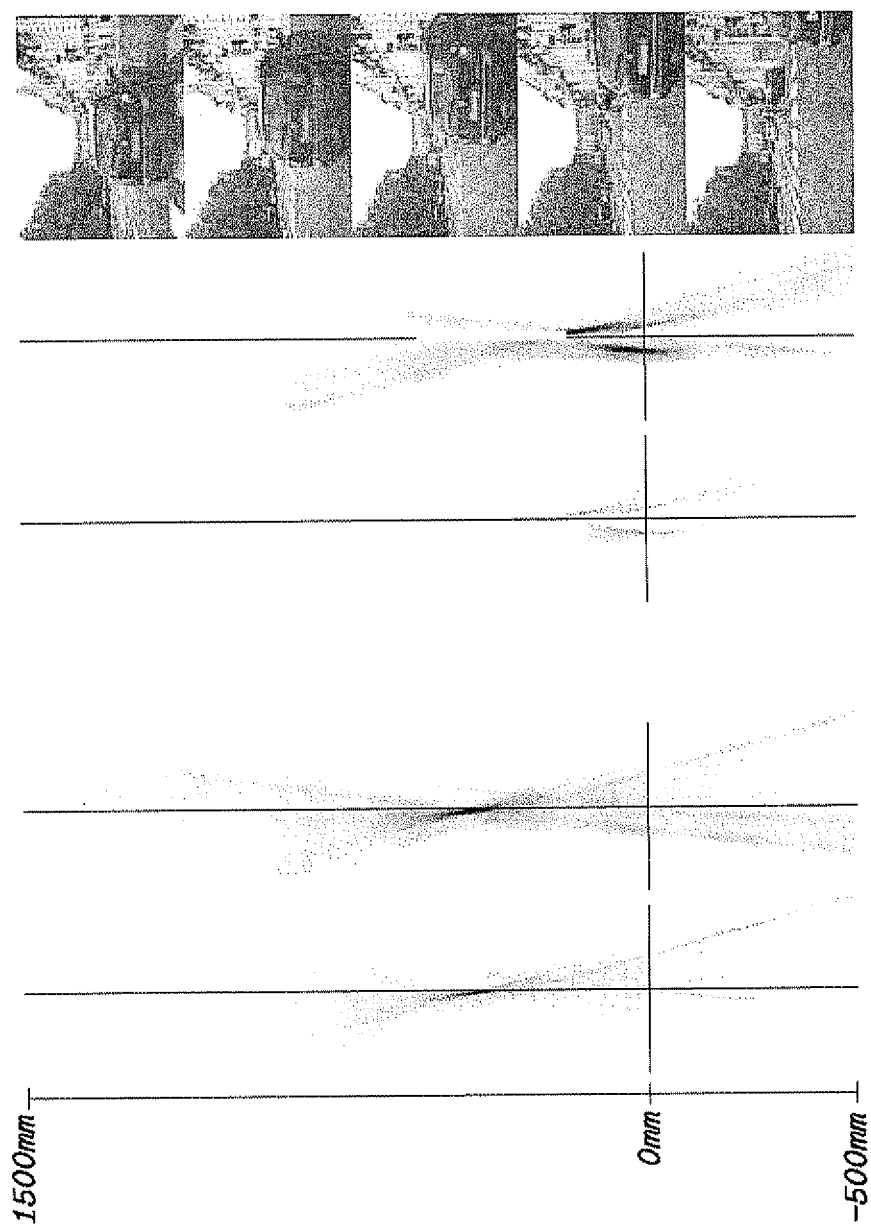
FIG. 7 shows estimation of translation in accordance with embodiments of the present invention and illustrates two examples of the voting accumulators, each showing the accumulator A and its $N(0, \sigma)$ smoothed variant Ã. Both cases represent an almost forward motion. The right one is at a lower speed and there was another motion candidate, caused by a car in front of the egomotion vehicle going at about the same speed and turning to the right. The illusory motion is therefore to the left, with no forward component. The coordinate lines intersect at $s=(0, 0)$.

The voting procedure is summarised in Algorithm 2 (FIG. 14). An accumulator of votes is initialised first, its domain being the translations in world co-ordinates. For example, its resolution can be set to 1 mm, its range for left-right offset $\Theta^{min}x=-200$ mm and $\Theta^{max}x=200$ mm and its backward-forward range $\Theta^{min}z=-500$ mm and $\Theta^{max}z=1500$ mm. Then, each point X that was successfully triangulated in both t-th and (t−1)-th frame adds a vote in the form of the top-view projected 2D line segment. As a final step, the accumulator is convolved with a kernel of 2D normal distribution, with deviation _ appropriate to cover all the other imprecisions in the triangulation. For example, _=5 mm. A position of the maximum in the convolved accumulator is then found as the translation vector s. FIG. 7 shows examples of the accumulated votes. Note that a typical length of a vote is, in the world co-ordinates, in the order of meters or tens of meters. Yet, as shown in the experiments, the maximum can be localized with a precision of few millimeters.

Figure 8:
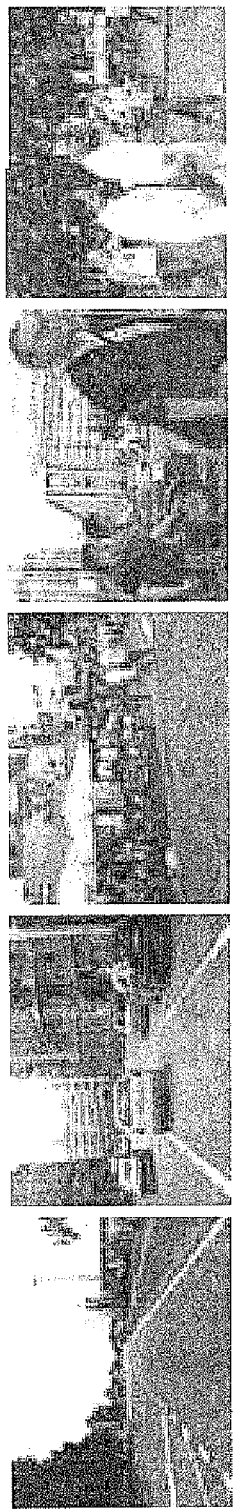
FIG. 8 shows sample frames from sequences used to test the egomotion estimation methods and systems of the present invention taken from open areas to crowded alleyways.
Figure 9:
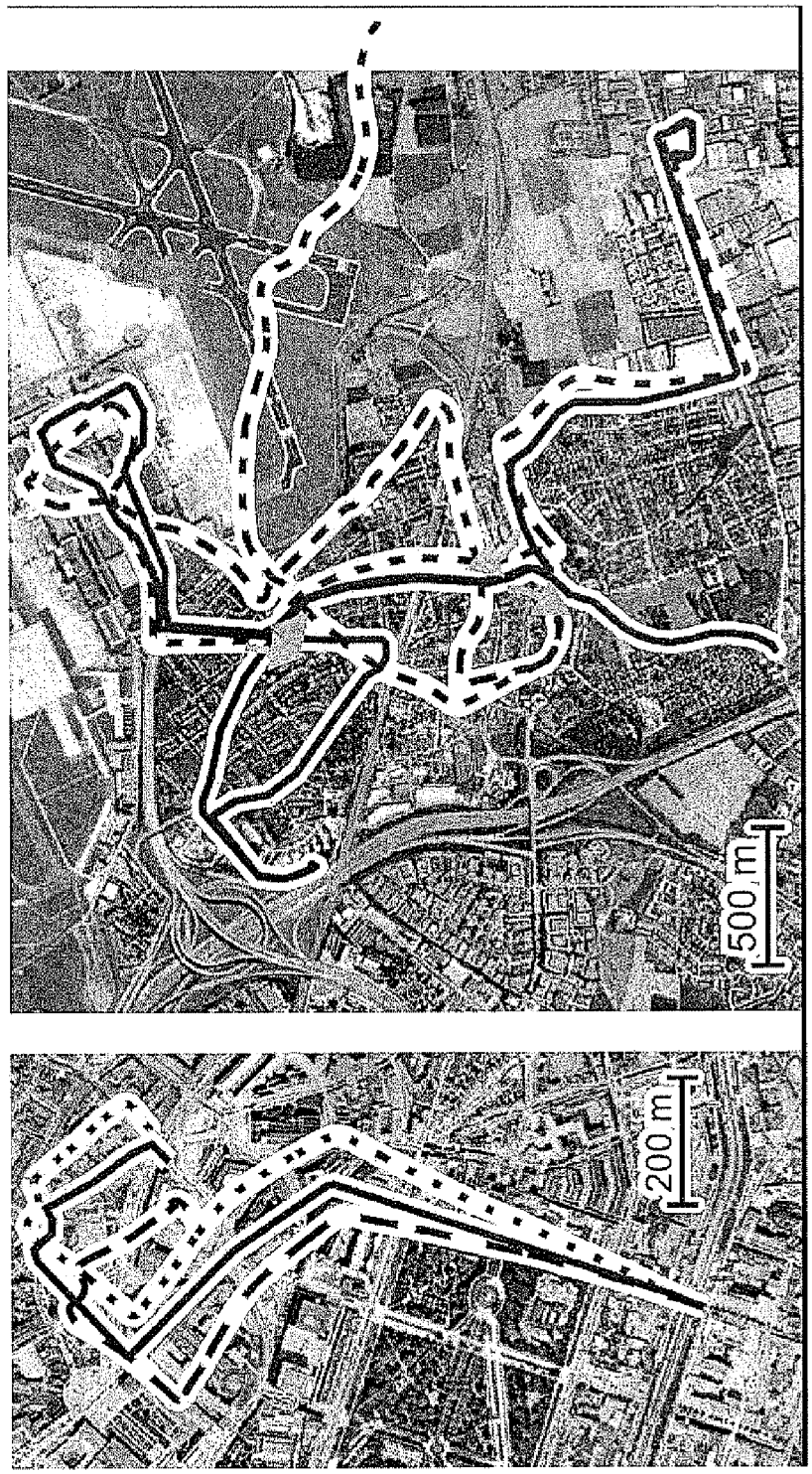
FIG. 9 comparison of reconstructed trajectories (dashed line) with hand-drawn ground-truth (solid line) using embodiments of the present invention. For the sequence on the left a trajectory obtained from the vehicle's CANbus data is also shown (dotted line).

The computational cost of the procedure is low once the correspondences were obtained. Since the correspondences are discretised in the pixel domain, the triangulation in camera-centric co-ordinates can be implemented as a table lookup. The voting itself requires rendering of line segments, which, if implemented e.g. on graphics hardware, is almost instantaneous. The only remaining non-trivial operations relate to the accumulator management—initialization, convolution with a Gaussian kernel and the maximum search—which are all fast and easily parallelisable. The approach has been tested on sequences that were taken with a stereo camera pair mounted on a vehicle driven through a city. The sequences, each several thousands of images long, represent real-world scenarios. They include sections of high-speed driving on an expressway as well as traffic congestions and a drive through a city center with pedestrian-crowded alleyways. Sample images are shown in FIG. 8. The egomotion was computed on frame-to-frame basis. An update to the orientation and location was calculated from one frame to the immediately following one, never considering preceding images. Therefore, the trajectories presented here are concatenations of thousands of increments. If an error was made in the computation of an increment, it was not compensated later. Nonetheless, the trajectories are precise, indicating that there were only few mistakes and that no significant errors accumulated over time. FIG. 9 shows top view of the sequences. The sequence on the left lasted about 8 minutes and consists of about 14000 image pairs taken at 30 frames per second. The figure shows our reconstructed trajectory (dashed) overlaid on a satellite map. The actual path, hand-drawn, is shown as a solid line. For this sequence there is also a record of the in-car data from the CANbus, with speed and turning angle readings. The trajectory restored from the CANbus data is shown as a dotted line. Using the CANbus data as ground-truth, we can separately evaluate rotation and translation estimates can be evaluated separately. The rotations are shown in left part of FIG. 10. By summing the incremental changes in yaw ( ) computed at each frame, the cumulative orientation is obtained and is drawn with a dashed line. The dotted line is for the CANbus orientation, which is again a cumulative sum of per-frame readings. The differences in the graphs are within the precision of camera calibration, which indicates that there is no systematic error in the computation accumulating over time.

Figure 10:
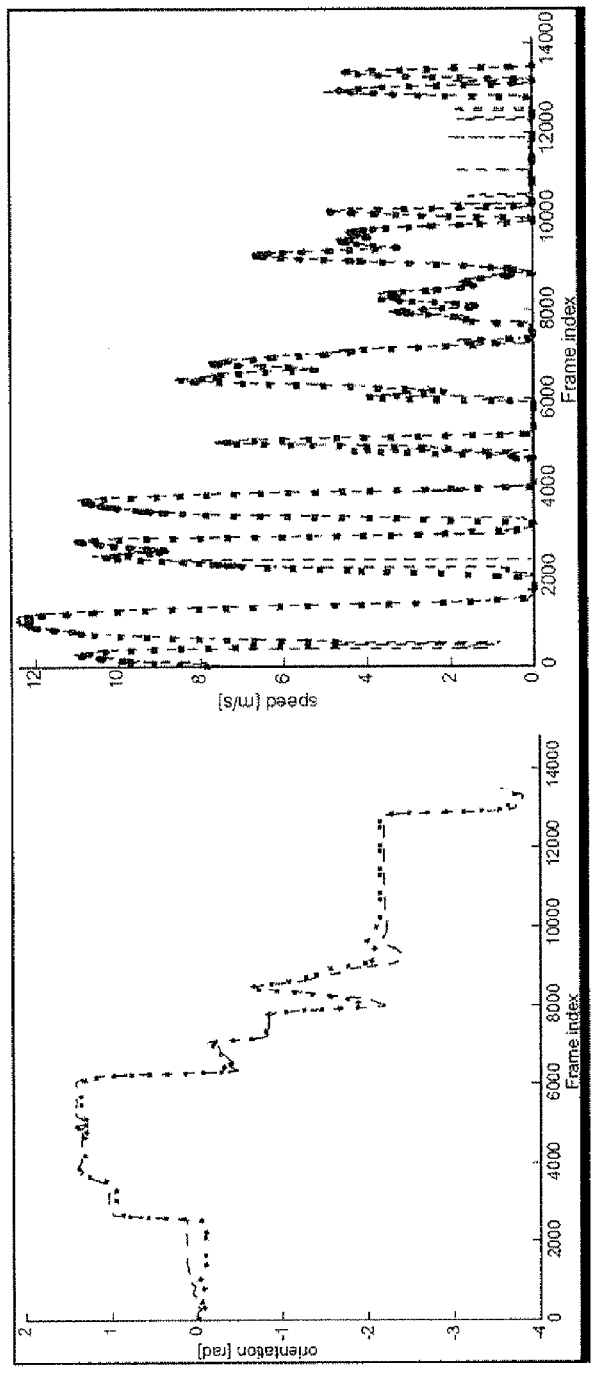
FIG. 10 shows a comparison of a computed (dashed line) and CANbus (dotted line) estimates on the sequence from the left side of FIG. 9. Left: progression of orientation (heading) of the test vehicle. The computed orientation (dashed line) is the cumulative sum of about 14000 yaw angle increments ($\psi$). Right: Speed of the vehicle. The computed speed (dashed line) is the length of the translation vector s.

The right side of FIG. 10 shows progression of vehicle's speed. At each frame, the actual speed is the length of the translation vector s. Again, the measurements are shown as a dashed line while the CANbus data are dotted. The graphs correspond well, but there are some mistakes to be seen. Mostly they concern acceleration from a stop at a crossing when there is another car immediately in front accelerating concurrently. In such cases the visually perceived speed is lower than actual. The most pronounced case can be seen at frames around 2200. Yet the mistakes are only few and their overall effect on the trajectory shown in FIG. 9 is small.

Figure 12:
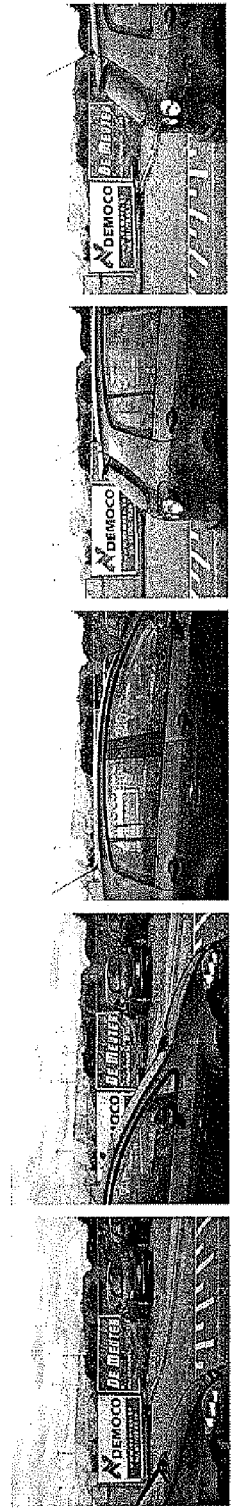
FIG. 12 shows a situation where there is a failure to recover the rotation correctly, the car passing in front makes a phantom rotation to the left.

In numbers, the difference between vision and CANbus speeds is in 92.5% of the measurements less than 1 m=s (33 mm for 30 fps), in 79.5% less than 10 mm and in 55% less than 5 mm. The second sequence shown in FIG. 9 is longer, lasting almost half an hour, and consisting of about 50000 stereo image pairs. Although the trajectory looks rather messy, it is in fact mostly correct at local scale. It starts at the bottom right corner and until the topmost part is reached, about 25000 video frames later, the differences are small. There is a failure to get the orientation correctly, bending the trajectory by about 45 degrees. The same happens in the leftmost part, resulting in a total difference in orientation of about 90 degrees at the end of the sequence. In both cases, the failure was due to other vehicles passing from left to right very close in front of the main vehicle, obscuring most of the field of view (see FIG. 12).

Figure 11:
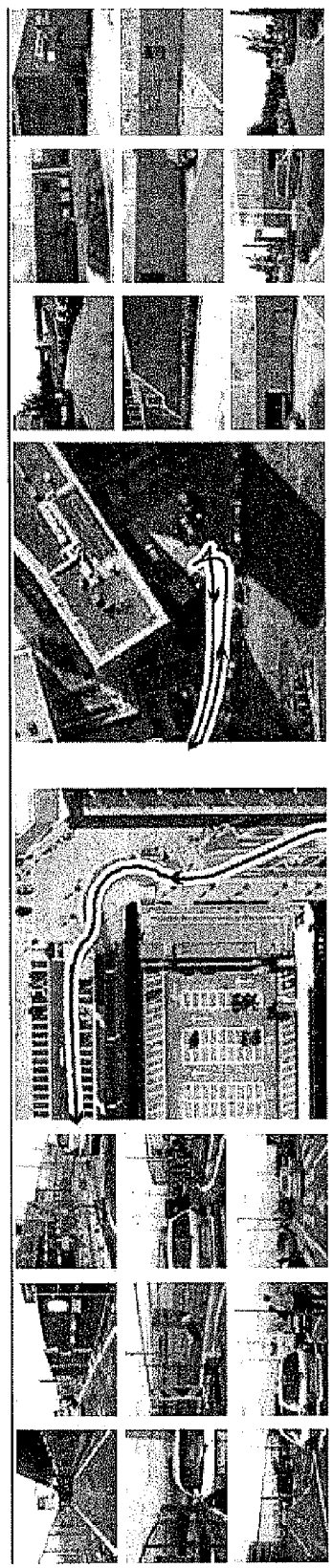
FIG. 11 shows two segments of the computed trajectory according to embodiments of the present invention with corresponding scene images. Left: repeated structures on the fences interfere with the correspondence search process, and other moving objects in the surroundings that create illusions of false egomotion. Right: turnabout maneuver which includes reversing.

FIG. 11 shows in detail parts of the sequences. Trajectory segments are accompanied with representative images from the on-board cameras. The first segment is an over a minute long passage through a detour, with presence of multiple distracting moving objects, but none of them dominant. The second one shows a turnabout maneuver that includes reversing. The orthomap backgrounds under the trajectories were aligned manually.

The following reference are incorporated by reference:

[1] C. F. Olson, L. H. Matthies, M. Schoppers, and M. W. Maimone, "Rover navigation using stereo ego-motion," Robotics and Autonomous Systems, vol. 43, no. 4, pp. 215-229, 2003.

[2] T. Lemaire, C. Berger, I.-K. Jung, and S. Lacroix, "Vision-based slam: Stereo and monocular approaches," Int. J. Comput. Vision, vol. 74, no. 3, pp. 343-364, 2007.

[3] A. Howard, "Real-time stereo visual odometry for autonomous ground vehicles," in IEEE/RSJ International Conference on Intelligent Robots and Systems. IEEE, 2008, pp. 3946-3952.

[4] D. Nister, O. Naroditsky, and J. Bergen, "Visual odometry for ground vehicle applications," Journal of Field Robotics, vol. 23, 2006.

[5] K. Cornelis, F. Verbiest, and L. Van Gool, "Drift detection and removal for sequential structure from motion algorithms," IEEE PAMI, vol. 26, no. 10, pp. 1249-1259, 2004.

[6] T. Thormahlen, N. Hasler, M. Wand, and H.-P. Seidel, "Merging of feature tracks for camera motion estimation from video," in Conference on Visual Media Production, 2008.

[7] A. J. Davison, I. D. Reid, N. D. Melton, and O. Stasse, "Monoslam: Real-time single camera slam," IEEE PAMI, vol. 29, 2007.

[8] R. M. Haralick, C.-N. Lee, K. Ottenberg, and M. Nolle, "Review and analysis of solutions of the three point perspective pose estimation problem," Int. J. Comput. Vision, vol. 13, no. 3, pp. 331-356, 1994.

[9] D. Nister, "An efficient solution to the five-point relative pose problem," IEEE PAMI, vol. 26, no. 6, pp. 756-777, 2004.

[10] S. Obdrzalek, M. Perd'och, and J. Matas, "Dense linear-time correspondences for tracking," in Workshop on Visual Localization for Mobile Platforms, CVPR 2008, June 2008.

[11] R. I. Hartley and A. Zisserman, Multiple View Geometry in Computer Vision, 2nd ed. Cambridge University Press, 2004.

[12] R. O. Duda and P. E. Hart, "Use of the Hough Transformation to Detect Lines and Curves in Pictures" Communications of the ACM, vol. 15, pp. 11-15, January 1972

What is claimed is:

1. A method of estimating egomotion of a vehicle from a sequence of stereo images taken with a stereo camera, the method comprising:
computing, from a first pair of stereo images and a second pair of stereo images preceding the first pair of stereo images in the sequence, increments between the first and second pairs of stereo images by determining an image correspondence set, correspondences of the image correspondence set being computed for all stereo image pairs in the sequence, and 3D triangulation of the correspondences to provide 3D points in a camera-centric co-ordinate system;
estimating rotational egomotion by voting on image motion vectors, the image motion vectors being weighted by the 3D distance from the correspondences to the stereo camera; and
estimating translational egomotion by voting on 3D motion vectors obtained by triangulating stereo correspondences in the first and second image pairs and by connecting the 3D points from correspondences in images from one camera of the stereo camera.

2. The method of claim 1, wherein the 3D motion vectors are weighted proportionally to the 3D distances.

3. The method of claim 1 wherein the estimation of egomotion is done in four dimensions.

4. The method of claim 1, wherein the first and second images are consecutive images.

5. The method of claim 1 wherein images that are obscured by other vehicles are ignored.

6. An image processor for estimation of egomotion of a vehicle from a sequence of stereo images taken with a stereo camera, the processor comprising:
a first computational part for computing, from a first pair of stereo images and a second previous pair of stereo images in the sequence, increments between the first and second pairs of stereo images by determining an image correspondence set, wherein correspondences of the image correspondence set being computed for all stereo image pairs in the sequence;
a second computational part for 3D triangulation of the correspondences to provide 3D points in a camera-centric co-ordinate system;
a third computational part for estimating rotational egomotion by voting on image motion vectors, the image motion vectors being weighted by the 3D distance from the correspondences to the stereo camera; and
a fourth computational part for estimating translational egomotion by voting on 3D motion vectors obtained by triangulating stereo correspondences in the first and second image pairs and by connecting the 3D points from correspondences in images from one camera of the stereo camera.

7. The image processor of claim 6, wherein the 3D motion vectors are weighted proportionally to the 3D distances.

8. The image processor of claim 6 wherein the estimation of egomotion is done in four dimensions.

9. The image processor of claim 6, wherein the first and second images are consecutive images.

10. The image processor of claim 6 wherein images are ignored that are obscured by other vehicles.

11. A computer program product stored on a machine readable non-transient storage medium for implementing the method of claim 6.

12. A method for computation of egomotion of a moving stereo camera from a stereo image sequence, comprising computing pitch and yaw of camera rotation independently of translation by voting, wherein a six-dimensional egomotion estimation is decomposed into first and second two-dimensional subproblems, wherein the first two-dimensional subproblem is solved for camera rotation and the second two-dimensional subproblem being solved for the camera translation.

13. A computer based system for computation of egomotion of a moving stereo camera from a stereo image sequence, wherein pitch and yaw of camera rotation are determined independently of translation by voting, wherein the system is adapted for a six-dimensional egomotion estimation by decomposing into first and second two-dimensional subproblems, wherein the first two-dimensional subproblem is solved for camera rotation and the second two-dimensional subproblem is solved the camera translation, and wherein the votes of the voting correspond directly to motion vectors by way of image correspondence in temporally consecutive images observed in one of the cameras, and the weight of the votes is a function of 3D distance of the observed objects.

* * * * *